JOHN C. BAKER.
Mowing Machine.

No. 118,673.  Patented Sep. 5, 1871.

Witnesses
Jno. A. Ellis
J. V. White

Inventor
John C. Baker,
per,
J. H. Alexander
Atty.

UNITED STATES PATENT OFFICE.

JOHN C. BAKER, OF MECHANICSBURG, OHIO.

IMPROVEMENT IN MOWING-MACHINES.

Specification forming part of Letters Patent No. 118,673, dated September 5, 1871.

*To all whom it may concern:*

Be it known that I, JOHN C. BAKER, of Mechanicsburg, in the county of Champaign and State of Ohio, have invented certain new and useful Improvements in Mowing-Machines; and I do hereby declare that the following is a full, clear, and exact description thereof, reference being had to the accompanying drawing and to the letters of reference marked thereon which form a part of this specification.

The nature of my invention consists in the attachment of a lever to the divider of a cutter-bar for mowing-machines in such a manner that, in turning corners and when backing the machine, said lever will catch on the ground and lift the track-cleaner and divider up from the ground.

In order to enable others skilled in the art to which my invention appertains to make and use the same, I will now proceed to describe its construction and operation, referring to the annexed drawing, in which—

Figure 1:
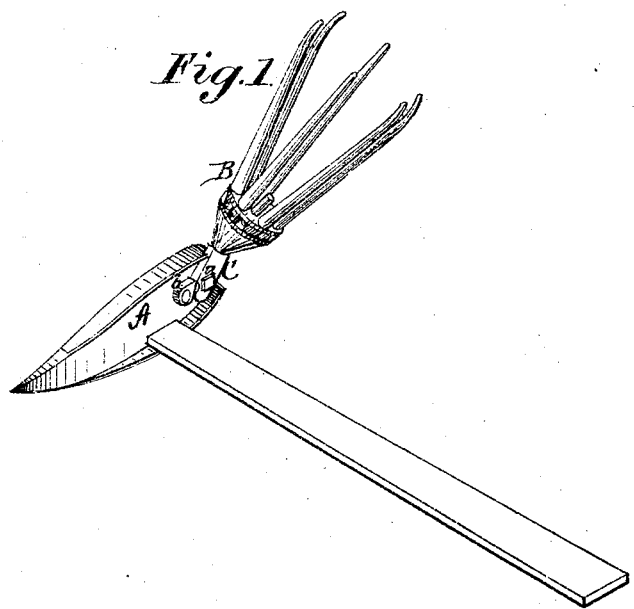
Figure 2:
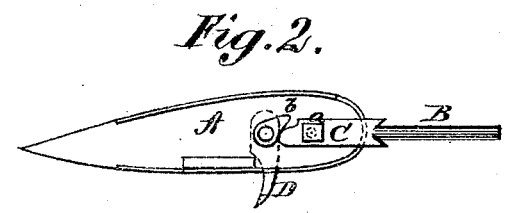

Figure 1 is a perspective view, and Fig. 2 a side view.

A represents the divider, and B the track-cleaner, which latter is pivoted to the divider by a bolt, *a*, through the arm C, attached to or forming part of the track-cleaner head. On the side of the divider A is pivoted a lever, D, which, if pivoted on the inner side of divider, is cam-shaped, so that when thrown forward it will bear against and raise the outer end of the arm C and with it the track-cleaner; but if this lever is, as represented in the drawing, pivoted on the outside, then a cam, *b*, is attached to the pivot on the inside of the divider, so as to bear down upon the inner end of the arm C, and thus, in like manner, raise the track-cleaner. Thus it will be seen that it is immaterial whether the lever is pivoted on the inside or outside of the divider, or in front or rear of the pin on which the track-cleaner is attached to the divider. The operation is precisely the same in either case.

In backing the machine and in turning corners the end of the lever D catches on the ground and turns on its pivot, lifting the track-cleaner, and, at the same time, lifts the cutter-bar and forms a runner. This obviates the very frequent trouble of breaking the cleaners in backing, by running their ends into the ground, without raising the cutter-bar.

Having thus fully described my invention, what I claim as new, and desire to secure by Letters Patent, is—

A lever attached to the divider of a cutter-bar for a mowing-machine, and arranged for automatically lifting the track-cleaner in turning corners and backing the machine, substantially as herein described.

In testimony that I claim the foregoing as my own I affix my signature in presence of two witnesses.

JOHN C. BAKER.

Witnesses:
J. E. HUNTER,
W. MARTIN.

(47.)